United States Patent [19]

Kawashita

[11] Patent Number: 4,648,132
[45] Date of Patent: Mar. 3, 1987

[54] COMMUNICATION CONTROL APPARATUS

[75] Inventor: Asayoshi Kawashita, Chigasaki, Japan

[73] Assignee: Hitachi, Ltd., Tokyo, Japan

[21] Appl. No.: 514,791

[22] Filed: Jul. 18, 1983

[30] Foreign Application Priority Data

Jul. 19, 1982 [JP] Japan .................... 57-124442

[51] Int. Cl.$^4$ ............................................. H04B 9/00
[52] U.S. Cl. ........................................ 455/607; 370/32; 455/608
[58] Field of Search .................. 455/606, 607, 608; 370/32, 24; 179/170.2, 170.6

[56] References Cited

U.S. PATENT DOCUMENTS

| | | | |
|---|---|---|---|
| 3,300,584 | 1/1967 | Jeanlin | 179/170.6 |
| 3,821,494 | 6/1974 | Besseyre | 179/170.6 |
| 3,906,172 | 9/1975 | Hoeschele, Jr. et al. | 179/170.6 |
| 4,052,562 | 10/1977 | Andorsen | 370/32 |
| 4,056,719 | 11/1977 | Waaben | 455/607 |
| 4,074,087 | 2/1978 | Blake, Jr. et al. | 179/170.2 |

FOREIGN PATENT DOCUMENTS 56-25845 3/1981 Japan .......................... 455/601

Primary Examiner—Joseph A. Orsino, Jr.
Attorney, Agent, or Firm—Antonelli, Terry & Wands

[57] ABSTRACT

In a communication system for performing the transmission and reception of data among a plurality of equipment, a communication control apparatus for governing the transmission and reception of data is connected to each of the equipment. Each of the communication control apparatus includes a transmitting and receiving device for the transmission and reception of electric signals, an optical transmitting device for converting the electric signal received by the transmitting and receiving device to a light signal and delivering it, an optical receiving device having an output terminal wired-OR connected between the transmitting and receiving device and the optical transmitting device whereby a light signal from the other apparatus is received, converted to an electric signal and delivered to the transmitting and receiving device, and a device responsive to the electric signal produced from the optical receiving device to prevent the output signal of the optical receiving device from being looped back to the optical transmitting device.

6 Claims, 9 Drawing Figures

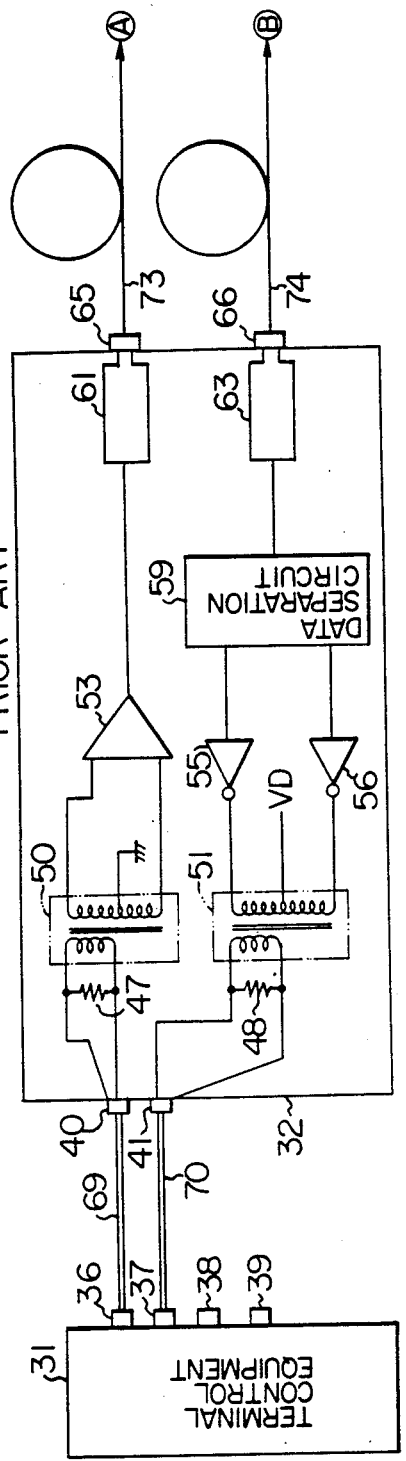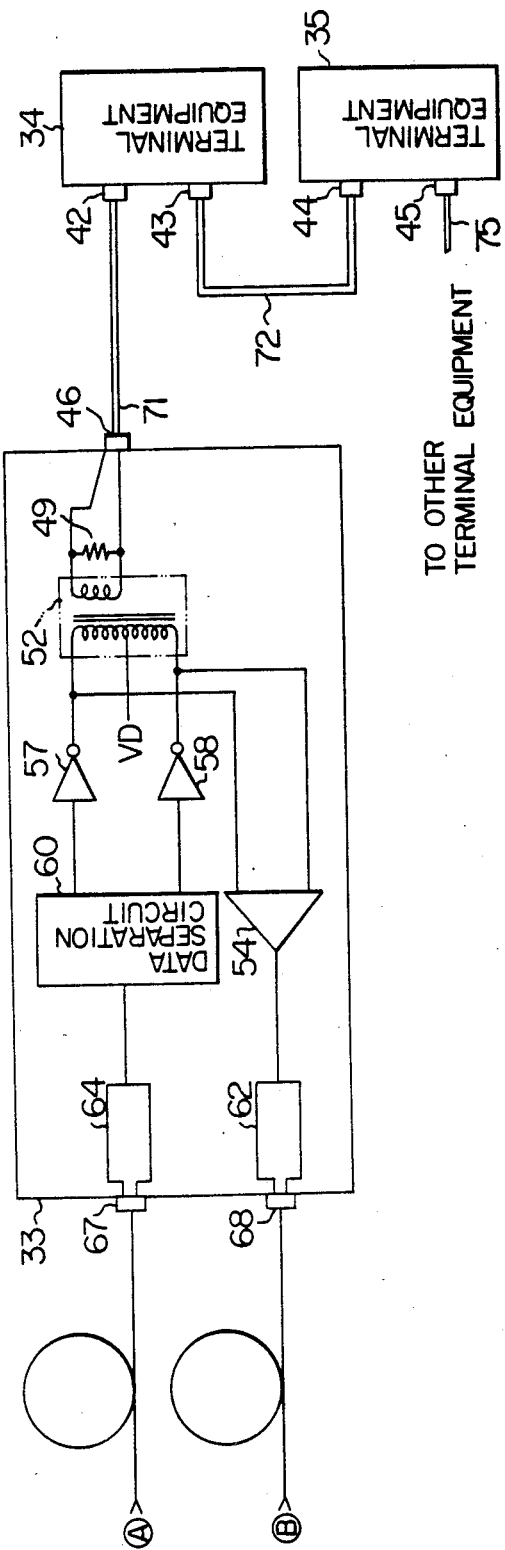
FIG. 3 PRIOR ART

COMMUNICATION CONTROL APPARATUS

BACKGROUND OF THE INVENTION

1. Field of the Invention

The present invention relates to a communication system for performing transmission and reception of data among a plurality of equipment and more particularly to a communication control apparatus for governing the transmission and reception of data.

2. Description of the Prior Art

A terminal handling system is known in the art in which a plurality of terminal equipment are connected to a control equipment, such as a terminal control equipment. Each of the terminal equipment includes output devices, such as a CRT display and a printer, and input devices, such as a keyboard. On the other hand, the terminal control equipment performs such operations as the processing of the data received from these input devices and a central processor forming a higher rank equipment and the editing of the data for delivery to the output devices. In this case, the transmission of data frequently occurs between the terminal control equipment and the terminal equipment. Generally, the half duplex bidirectional communication system is known as one method for the transmission of data between the two equipment.

In other words, each of the terminal equipment and the terminal control equipment includes a communication controller and the transmission of data is effected between the communication controllers.

FIG. 1 shows the communication controller of the terminal control equipment. In the terminal control equipment, a signal 101 generated from a transmission/reception control unit 11 is modulated by a modulating circuit 12 and then applied to pulse transformers 25 and 26 through driver circuits 14, 15 and 20, 21, respectively. The transformers 25 and 26 respectively generate RZI (return-to-zero-inverted) bipolar signals 104 and 105 which in turn are respectively transmitted to the terminal equipment through connectors 17 and 24 and coaxial cables. On the other hand, bipolar signals 104 and 105 received from the terminal equipment through the connectors 17 and 24 are respectively transmitted to the pulse transformers 25 and 26. These signals are then amplified by amplifier circuits 18 and 22, respectively. The resulting outputs 106 and 109 are applied to an OR circuit 19 and the resulting logical sum output 107 is applied to a demodulating circuit 13. The demodulating circuit 13 converts the RZI signal to a regular logic signal 108 and applies it to the transmission/reception control unit 11. Designated at $V_D$ is the drive voltage for the pulse transformers 25 and 26 and terminating resistors 16 and 23 have the same resistance value as the characteristic impedance of the coaxial cables so as to serve the function of suppressing the reflection of the transmitted and received signals.

FIG. 2 shows the communication controller in the terminal equipment.

In the terminal equipment, a signal 202 generated from a transmission/reception control unit 80 is modulated by a modulating circuit 81 and applied to a pulse transformer 85 through driver circuits 83 and 84. Thus, the pulse transformer 85 generates an RZI bipolar signal 205 and the signal 205 is transmitted to the terminal control equipment from a connector 87 through a coaxial cable. On the other hand, an RZI bipolar signal 205 received from the terminal control equipment through the connector 87 is transmitted to the pulse transformer 85. Then, the signal 205 is amplified by an amplifier circuit 86 and the resulting amplified output 206 is applied to a demodulating circuit 82. The demodulating circuit 82 converts the RZI signal to the regular logic signal 201 and applies it to the transmission/reception control unit 80. Designated at $V_D$ is the drive voltage for the pulse transformer 85. A connector 88 is provided so that the signal received at the connector 87 from the terminal control equipment through the coaxial cable is sent to any other terminal equipment within the terminal system. A terminating resistor 90 has the same resistance value as the characteristic impedance of the coaxial cables so as to serve the function of suppressing the reflection of transmitted and received signals. A terminal on/off switch 89 is provided so that it is turned on to make the terminating resistor 90 effective only when the corresponding terminal equipment is located at the extreme end within the terminal system.

FIG. 3 is a diagram for explaining a prior art technique for realizing the required half duplex bidirectional transmission between the terminal control equipment and the terminal equipment in the form of optical data communication. A terminal control equipment 31 includes two communication controllers of the type shown in FIG. 1 and it also includes four connectors 36 to 39. On the other hand, a plurality of terminal equipment 34 and 35 are each provided with a single communication controller of the type shown in FIG. 2 and also they are respectively provided with connectors 42, 43 and 44, 45. Optical data sets 32 and 33 are arranged between the terminal control equipment 31 and the terminal equipment 34, and of the connectors connected to the terminal control equipment 31 the connectors 36 and 37 are respectively provided for transmitting and receiving purposes. The connector 36 and 37 and connectors 40 and 41 provided on the side of the optical data set 32 are connected by coaxial cables 69 and 70, respectively. In the optical data set 32, the RZI bipolar signal applied through the connector 40 is received by a pulse transformer 50. Then, the signal is amplified by an amplifier circuit 53 whose output is applied to the input of an optical transmitter 61. The optical transmitter 61 serves the function of using for example a TTL-level signal to effect an LED on/off control and converting it into a light signal. This LED light output is sent to an optical receiver 64 of the optical data set 33 through an optical cord 73 whose ends are respectively connected to optical connectors 65 and 67. The optical receiver 64 serves the function of receiving the light signal by a photodiode and converting it to a TTL-level signal. The signal output of the TTL level is applied to the input of a data separation circuit 60. An RZI bipolar signal is generated by the data separation circuit 60, driver circuits 57 and 58 and a pulse transformer 52 and this signal is transmitted to the terminal equipment 34 through a connector 46, a coaxial cable 71 and the connector 42. Simultaneously, this bipolar signal is also transmitted to the terminal equipment 35 through the connector 43, a coaxial cable 72 and the connector 44. Also, the signal is similarly transmitted from the terminal equipment 35 to other terminal equipment through the connector 45 and a coaxial cable 75.

On the other hand, the RZI bipolar signal sent from the terminal equipment such as the terminal equipment 35 is applied to the optical data set 33 through the connector 44, the coaxial cable 72, the connector 42, the coaxial cable 71 and the connector 46. In the optical data set 33, this input signal is converted to a TTL-level signal by the pulse transformer 52 and an amplifier circuit 54 and the output from the amplifier circuit 54 is applied to an optical transmitter 62. This optical transmitter 62 functions in the same manner as the previously mentioned optical transmitter 61 so that the light output from the LED included in the optical transmitter 62 is transmitted to an optical receiver 63 in the optical data set 32 through an optical connector 68, an optical cord 74 and an optical connector 66. The optical receiver 63 serves the same function as the optical receiver 64 and its signal output of the TTL level is applied to the input of a data separation circuit 59. The data separation circuit 59 applies its output signal to a pulse transformer 51 through driver circuits 55 and 56. The pulse transformer 51 produces an RZI bipolar signal and the signal is transmitted to the terminal control equipment 31 through the connector 41, the coaxial cable 70 and the connector 37. In the Figure, designated at $V_D$ is the drive voltage for the pulse transformers 50 to 52. The connectors 38 and 39 of the terminal control equipment 31 are provided so as to be interfaced with another group of terminal equipment by coaxial cables. Terminating resistors 47 to 49 have the same resistance value as the characteristic impedance of the coaxial cables so as to serve the function of suppressing the reflection of transmitted and received signals. It is the usual practice to use the optical cards 73 and 74 in the form of two-core optical cable pairs.

The above-described prior art technique has the following disadvantages. The first disadvantage is that in the optical data set 33 the signal for driving the pulse transformer 52 is also applied to the amplifier circuit 54. Thus, there arises a situation in which the drive signal is looped back to the optical data set 32 and hence the drive signal collides with the transmitting data to the terminal control equipment 31 in the pulse transformer 51. This causes an excessive current flow in the pulse transformer 51 and the pulse transformer 51 is damaged. Thus, it is necessary to make modifications to the communication controller connected to the connector 37 of the terminal control equipment 31 so that the driver circuits 20 and 21 are eliminated from the construction of FIG. 1 and that the drive voltage $V_D$ applied to the middle point of the pulse transformer 26 is eliminated and the middle point is connected to ground. As a result, the existing standard terminal system cannot be changed into an optical communication system without modification.

The second disadvantage is that the construction of the optical data set differs depending on whether it is arranged on the side of the terminal control equipment or the terminal equipment and therefore it is necessary to develop two kinds of optical data set with the resulting increase in the development cost.

The third disadvantage is that the exclusive use of the two connectors of the terminal control equipment 31 reduces the number of terminal equipment to be connected in the system (by an amount for one trunk).

SUMMARY OF THE INVENTION

According to the invention there are provided a communication control apparatus including modulating means for modulating a logical signal generated from a transmitting and receiving unit to a transmitting signal, at least one transmitting and receiving means for transmitting the output signal from the modulating means to a circuit, demodulating means wired-OR connected between the modulating means and the transmitting and receiving means for demodulating a signal transmitted from other apparatus and received by the transmitting and receiving means to a logical signal, and means responsive to the output signal from the modulating means to prevent the same from being looped back to the transmitting and receiving means, and a communication system for performing the transmission and reception of data among a plurality of equipment each including the said communication control apparatus.

Further, according to the invention there are provided a communication control apparatus including transmitting and receiving means for effecting the transmission and reception of electric signals, optical transmitting means for converting an electric signal received by the transmitting and receiving means to a light signal and delivering the same, optical receiving means wired-OR connected between the transmitting and receiving means and the optical transmitting means to convert a light signal from other apparatus to an electric signal and apply the same to the transmitting and receiving means, and means responsive to the electric signal generated from the optical receiving means to prevent the same from being looped back to the optical transmitting means, and a communication system for performing the transmission and reception of data among a plurality of equipment each thereof having connected thereto the above-described communication control apparatus.

It is therefore an object of the present invention to provide a communication control apparatus designed to prevent the occurrence of loop-back in the transmitting and receiving section thereof.

It is another object of the present invention to provide a communication system for a plurality of equipment each having a communication control apparatus designed to prevent the occurrence of loop-back in the transmitting and receiving section thereof.

BRIEF DESCRIPTION OF THE DRAWINGS

FIG. 3 is a block diagram for explaining a prior art technique.

DESCRIPTION OF THE PREFERRED EMBODIMENTS

A preferred embodiment of the invention will now be described with reference to the drawings.

Figure 4:
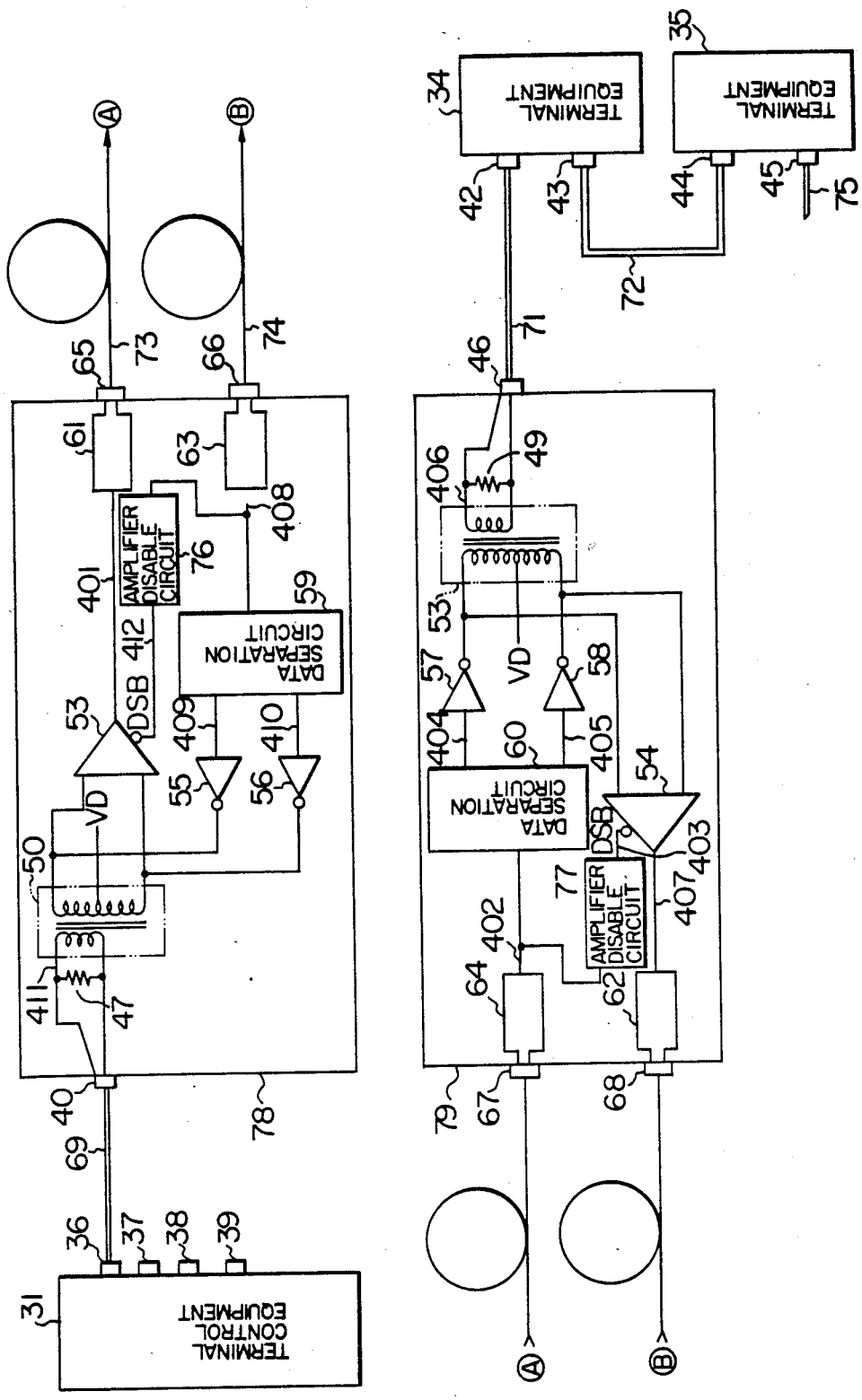
FIG. 4 is a block diagram showing the construction of an embodiment of the invention.
Figure 5:
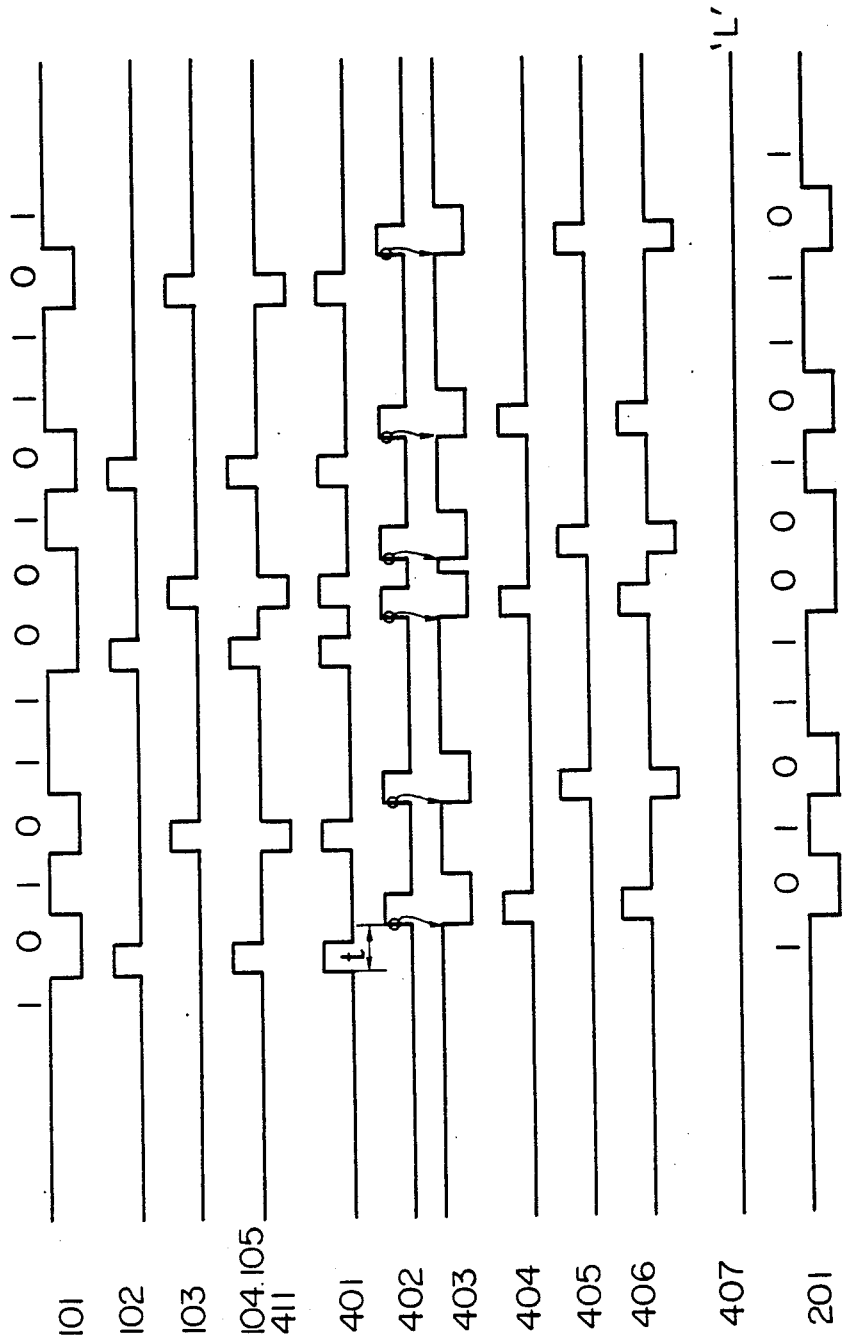
FIG. 5 is a time chart showing the timing of the operation of various parts when a data is transmitted from a terminal control equipment.
Figure 6:
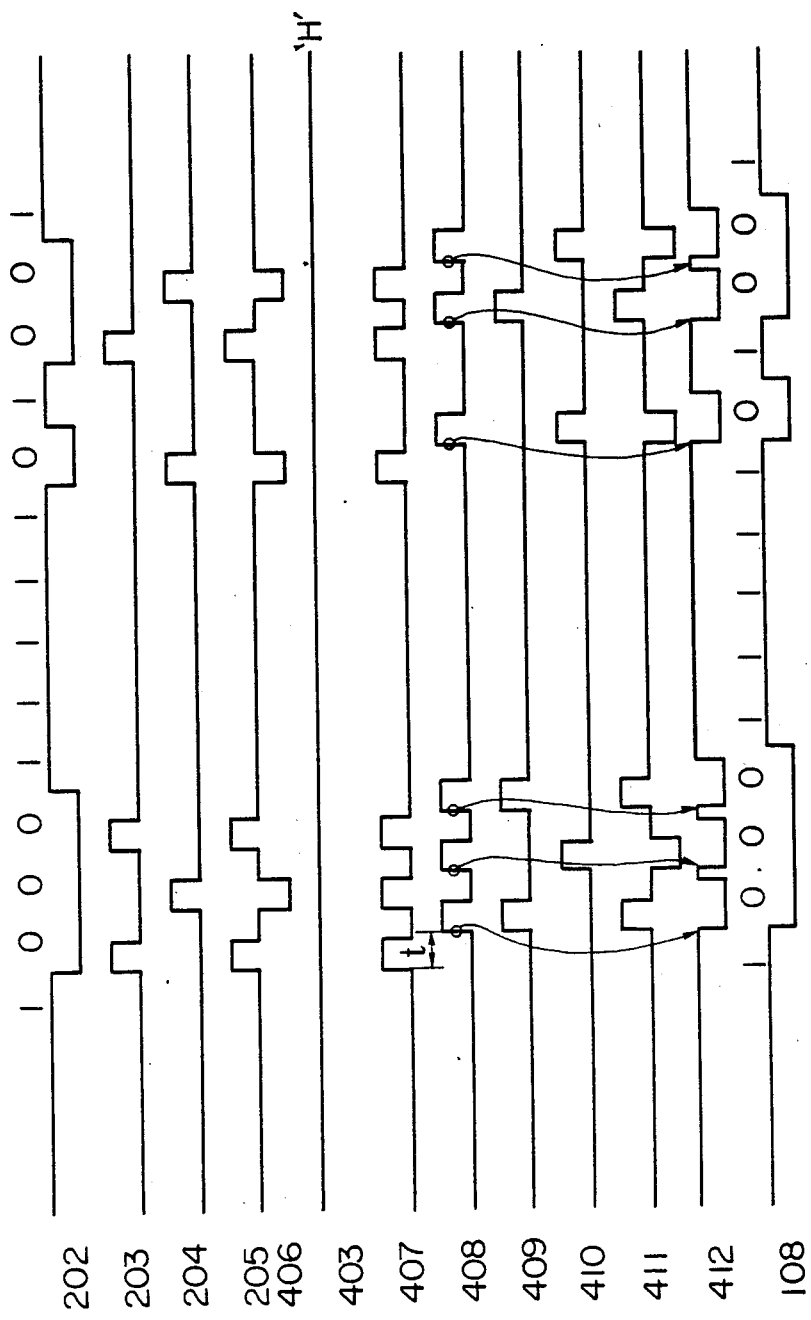
FIG. 6 is a time chart showing the operation of various parts when a data is transmitted from a terminal equipment.

FIG. 4 is a diagram showing the construction of an optical communication system according to the embodiment of the invention. FIGS. 5 and 6 are time charts useful for explaining the operation of the embodiment of FIG. 4.

Figure 1:
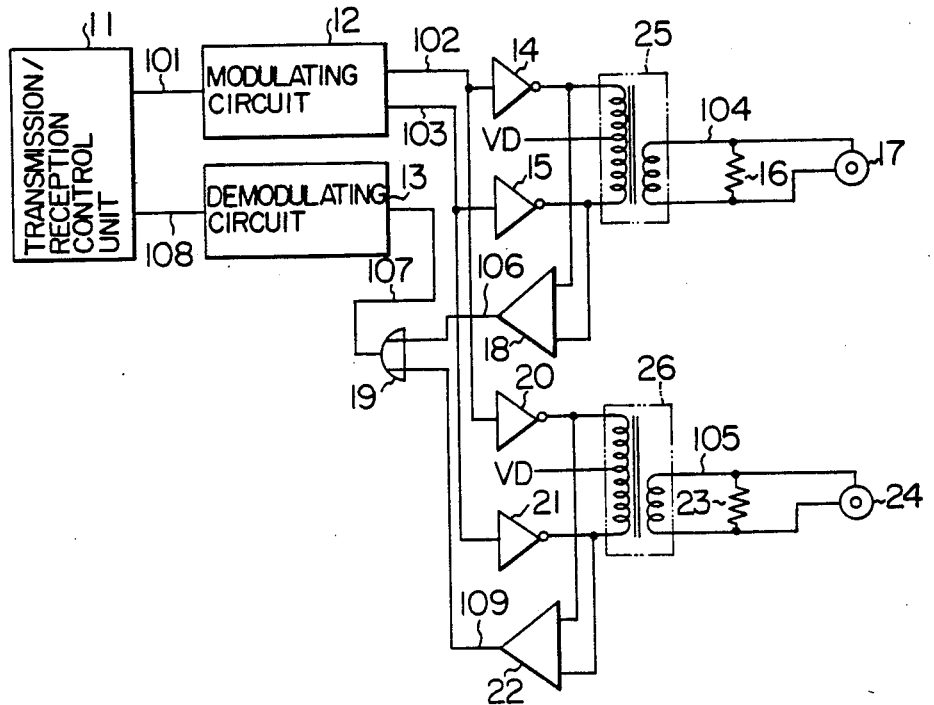
FIG. 1 is a diagram showing a known communication controller of a terminal control equipment.

A terminal control equipment 31 includes two units of the communication controller shown in FIG. 1 and it also includes four connectors 36 to 39. On the other hand, terminal equipment 34 and 35 each includes a single unit of the communication controller shown in FIG. 2 and they also include respectively connectors 42, 43 and 44, 45 as mentioned previously with reference to FIG. 3. Optical data sets 78 and 79 are arranged between the terminal control equipment 31 and the terminal equipment 34 and 35 and the connector 36 of the terminal control equipment 31 is connected to a connector 40 of the optical data set 78 by a coaxial cable 69. The optical data sets 78 and 79 are interconnected by an optical cord 73 having optical connectors 65 and 67 at the ends thereof and an optical cord 74 having optical connectors 66 and 68 at the ends thereof, and the optical data set 79 is connected to the terminal equipment 34 with a coaxial cable 71 by connectors 46 and 42. Also, the terminal equipment 34 and 35 are connected with a coaxial cable 72 by the connectors 43 and 44.

The transmission of data from the terminal control terminal 31 will now be described with reference to FIG. 5. An RZI signal received at the connector 40 has a signal waveform 411 shown in FIG. 5. This signal is applied to a pulse transformer 50 whose output is applied to an amplifier circuit 53 and its output is converted to an RZI monopolar signal as shown at 401 in FIG. 5. When this signal is applied to an optical transmitter 61, its light converter converts the signal, e.g., the TTL signal to a light signal and the light signal is then applied to an optical receiver 64 through the optical connector 65, the optical cord 73 and the optical connector 67. In the optical receiver 64, the light signal is converted to a TTL signal and the resulting output signal 402 has the similar waveform with the signal 401 as shown in the Figure, though it is delayed from the signal 401 by a time t as shown in the Figure due to the cable, etc. This signal 402 is applied to a data separation circuit 60 and an amplifier disable circuit 77, respectively. The amplifier disable circuit 77 generates a low level output for a suitable period of time (less than one bit-cell time in this case) from the positive transition of the signal 402. This output signal 403 has the waveform shown in FIG. 5 so that the signal 403 is applied to the disable (DSB) input of an amplifier circuit 54 before the application of the signal 402 to the two inputs of the amplifier circuit 54 through the circuits 60, 57 and 58, thus preventing the operation of the amplifier circuit 54. On the other hand, the signal 402 applied to the data separation circuit 60 is separated into signals 404 and 405 and they have the waveforms as shown in FIG. 5. These signals generate through the driver circuits 57 and 58 and a pulse transformer 53 a signal 406 or RZI bipolar signal and its waveform becomes as shown in FIG. 5. The signal 406 is applied to the terminal equipment 34 and 35 via the connectors 42 to 44 and 46 and the coaxial cables 71 and 72. At this time, the output 407 of the amplifier circuit 54 is maintained at the low level by the previously mentioned disable input 403 and there is no danger of the signal 407 being looped back to the terminal control equipment 31.

Next, the transmission of data from the terminal equipment 34 and 35 will be described with reference to FIG. 6. An RZI bipolar signal generated from the terminal equipment 35 is applied to the optical data set 79 through the connector 44, the coaxial cable 72, the connectors 43 and 42, the coaxial cable 71 and the connector 46. This signal 406 has the waveform shown in FIG. 6. The signal 406 is received by the pulse transformer 53 and its output is applied to the amplifier circuit 54. The disable (DSB) input signal 403 of the amplifier circuit 54 is at the high level (the enable state) as shown in FIG. 6 so that the resulting output signal 407 of the amplifier circuit 54 has an RZI monopolar waveform as shown in FIG. 6 and the signal 407 is applied to the input of an optical transmitter 62. The optical transmitter 62 functions in the same manner as the optical transmitter 61 so that the TTL signal is converted to a light signal and the light signal is applied to a optical receiver 63 through the connector 68, the optical cord 74 and the optical connector 66. The optical receiver 63 converts the light signal to a signal 408 of the TTL level and the signal 408 has the similar waveform as the signal 407, although it is delayed by a time t as shown in the Figure due to the cable, etc. The signal 408 is applied to the input of a data separation circuit 59 and an amplifier disable circuit 76, respectively. The amplifier disable circuit 76 functions to generate an output which goes to the low level for a suitable time (less than one bit-cell time in the embodiment) from the positive-going transition of the signal 408. This output signal 412 has the waveform shown in FIG. 6 so that the signal 412 is applied to the disable (DSB) input of the amplifier 53 and prevents the amplifier circuit 53 from operating before the application of the signal 408 to the two inputs of the amplifier circuit 53 through the circuits 59, 55 and 56. On the other hand, the signal 408 applied to the data separation circuit 59 is divided into signals 409 and 410 and their waveforms become as shown in FIG. 6. These signals are converted to a signal 411 or RZI bipolar signal by the driver circuits 55 and 56 and the pulse transformer 50 and its waveform becomes as shown in FIG. 6. The problem in this case, i.e., the output signal 401 of the amplifier circuit 53 is maintained at the low level by the previously mentioned disable input 412 and thus there is no danger of the output signal 401 being looped back to the terminal equipment 34 and 35.

Figure 7:
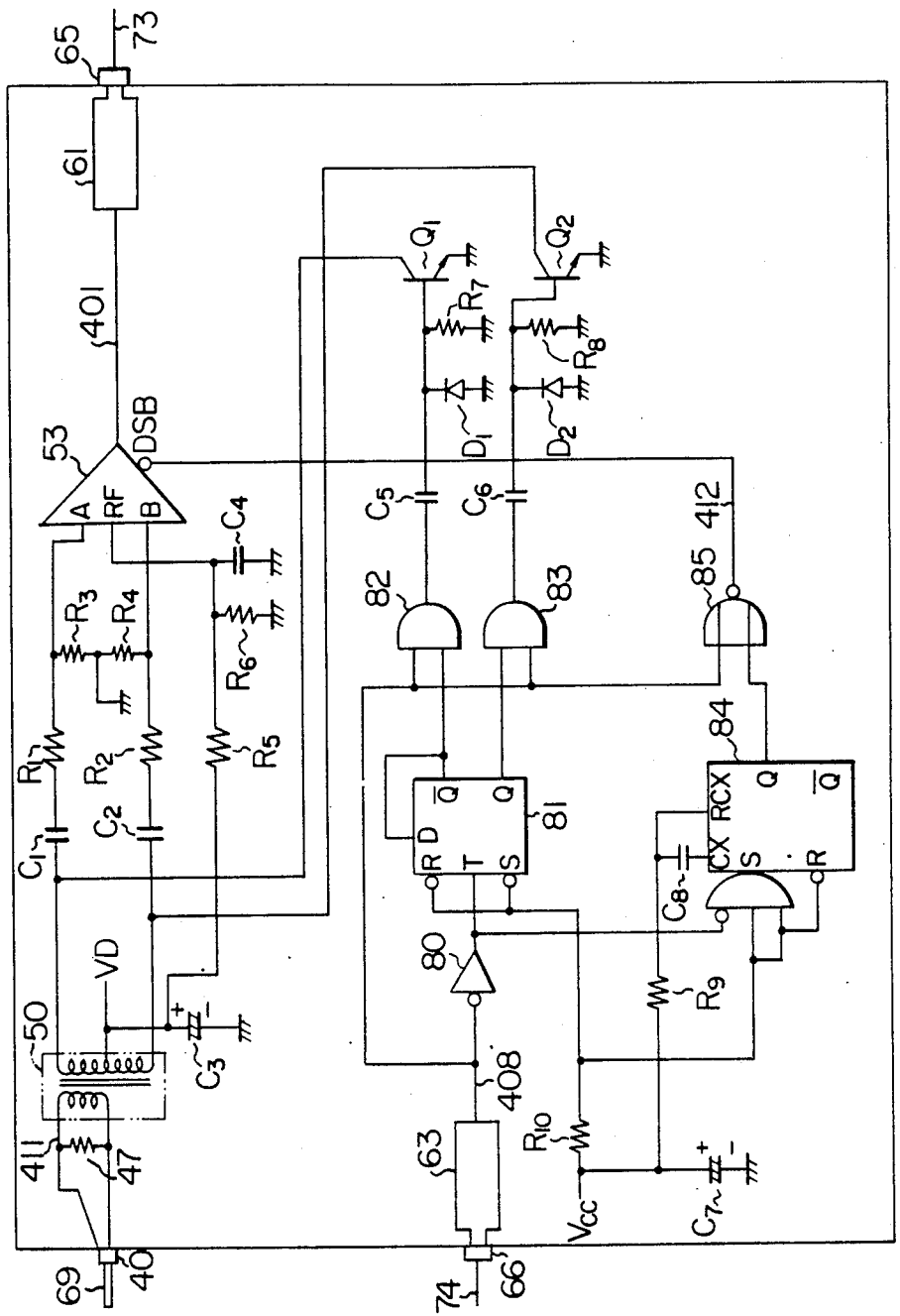
FIG. 7 is a detailed circuit diagram of an optical data set 78.

FIG. 7 shows the optical data set 78 of FIG. 4 in greater detail.

FIG. 7 shows more particularly than FIG. 4 that a bypass capacitor $C_3$ is connected between the drive voltage $V_D$ of the pulse transformer 50 and ground, that dc coupling capacitors $C_1$ and $C_2$, attenuator resistors $R_1$ and $R_2$ and resistors $R_3$ and $R_4$ are connected between the pulse transformer 50 and the sense amplifier circuit 53 and the resistors $R_3$ and $R_4$ connected to ground have their other ends respectively connected to the inputs A and B of the sense amplifier circuit 53, that the sense amplifier circuit 53 has its terminal RF connected to one terminal of a resistor $R_5$ having its other terminal connected to the drive voltage $V_D$ and one terminal of a resistor $R_6$ having other terminal connected to ground for the purpose of determining the sense level (reference level) of the sense amplifier circuit 53 and that a bypass capacitor $C_4$ is connected between the terminal RF and ground. In addition, the data separation circuit 59 of FIG. 4 includes an inverter 80, a flip-flop 81 and AND gates 82 and 83 in FIG. 7. The driver circuits 55 and 56 of FIG. 4 respectively include dc coupling capacitors $C_5$ and $C_6$, clamping diodes $D_1$ and $D_2$, bypass resistors $R_7$ and $R_8$ and transistors $Q_1$ and $Q_2$ and each of the transistors $Q_1$ and $Q_2$ has its collector connected to the primary terminal of the pulse transformer 50. Also, in FIG. 7 the amplifier disable circuit 76 includes a monostable multivibrator 84 and a NOR circuit 85. A capacitor $C_8$ and a resistor $R_9$ are connected to the input terminal $C_x$ of the monostable multivibrator 84 and the resistor $R_9$ is also connected to the other input terminal $RC_x$. This RC constant determines the output time width of the output terminals Q and $\overline{Q}$, respectively, of the monostable multivibrator 84. The output signal from the output terminal Q is applied to the NOR circuit 85 whose output signal 412 is in turn applied to the input DSB of the sense amplifier circuit 53. The NOR circuit 85 also receives the output signal 408 from the optical transmitter 63. In the Figure, designated at $R_{10}$ is a pull-up resistor for the idle terminals of the flip-flop 81 and the monostable multivibrator 84, and $C_7$ a bypass capacitor for a power supply $V_{cc}$.

The operation of the various parts shown in FIG. 7 will now be described. Basically, the operation is the same as described in connection with FIG. 4 and therefore the operation of the parts shown in greater detail will be described.

The signal 411 applied through the coaxial cable 69 and the connector 40 is subjected to level change and finally applied to the inputs A and B of the sense amplifier circuit 53. If the absolute value of the difference between the voltage to the inputs A and B is greater than the reference voltage level applied to the input BF and if a high level signal is applied to the input DSB, the output of the sense amplifier circuit 53 or the signal 401 goes to the high level. On the other hand, if the absolute value of the difference between the voltages to the inputs A and B is smaller than the reference voltage level and if the high or low level is applied to the input DSB, the signal 401 goes to the low level.

On the other hand, the light signal received by way of the optical cord 74 and the optical connector 66 is converted to an electric signal or signal 408 by the optical receiver module 63. In synchronism with the falling edge of the signal 401 the flip-flop 81 is operated so as to operate one or the other of the AND gates 82 and 83, with the result that the gate receiving the high level Q or $\overline{Q}$ output generates a high level output at its output as long as the signal 408 is at the high level and the gate receiving the low level Q or $\overline{Q}$ output remains at the low level. As a result, one of the transistors $Q_1$ and $Q_2$ is turned on and the other is turned off and the primary winding of the pulse transformer 53 is driven by the drive voltage $V_D$. At this time, a voltage of substantially the same level as the primary voltage is induced in the secondary winding and this voltage is transmitted to the various equipment through the connector 40 and the coaxial cable 69. On the other hand, the primary winding drive voltage is also applied to the inputs A and B of the sense amplifier circuit 53 through the capacitors $C_1$ and $C_2$ and the resistors $R_1$, $R_2$, $R_3$ and $R_4$. While the difference between the voltage levels at the two inputs is naturally sufficient to cause the resulting output signal 401 to go to the high level, due to the high level of the signal 408 applied to the upper input of the NOR gate 85, the inverted output of the NOR gate 85 goes to the low level and this low level signal is applied to the input DSB of the sense amplifier circuit 53 thereby preventing its output signal 401 from going to the high level. Further, when the signal 408 changes from the low level to the high level, the signal 408 is inverted by the inverter 80 so that the resulting low level signal is applied to the upper input (negative logic input) of the monostable multivibrator 84 and immediately thereafter a high level signal is generated at its output Q. The pulse width of this output signal is equal to the time determined by the capacitor $C_8$ and the resistor $R_9$ connected to the terminals $C_x$ and $RC_x$ of the monostable multivibrator 84. Thus, if the pulse width of the Q output is selected to be greater than that of the signal 408, when the Q output is applied to the lower input of the NOR gate 85, its output signal 412 disables the sense amplifier circuit 53 until the signals applied to its inputs A and B disappear and the signal 401 is maintained at the low level. Also, by selecting the gate delay of the NOR gate 85 to be smaller than those of the AND gates 82 and 83, it is possible to cause the input DSB to go to the low level before the back signals of the pulse transformer drive signal appear at the inputs A and B of the sense amplifier circuit 53. By so doing, it is possible to completely disable the sense amplifier circuit 53 and thereby prevent the occurrence of any loop-back which is the problem with the prior art apparatus.

Figure 2:
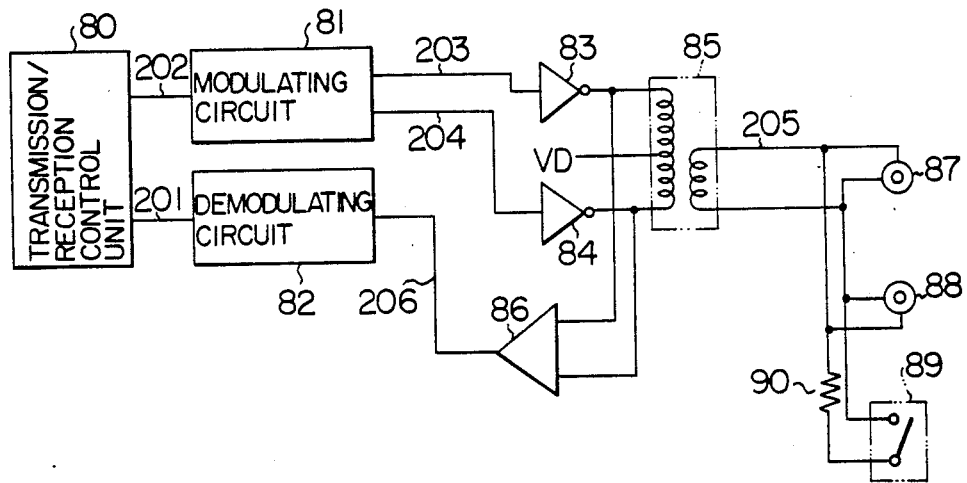
FIG. 2 is a known communication controller of a terminal equipment.

While a preferred embodiment of the invention has been described, it is needless to say that the present invention is also applicable to the wired-OR connection of the transmitting and receiving section in the communication controllers shown in FIGS. 1 and 2, respectively.

More specifically, this can be realized by arranging the circuit so that in FIG. 1 a disable signal is generated in accordance with the bipolar signal generated from the modulating circuit 12 and an AND gate generates a logical product of the disable signal and the modulating circuit output looped back from the wired-OR connection portion.

Figure 8:
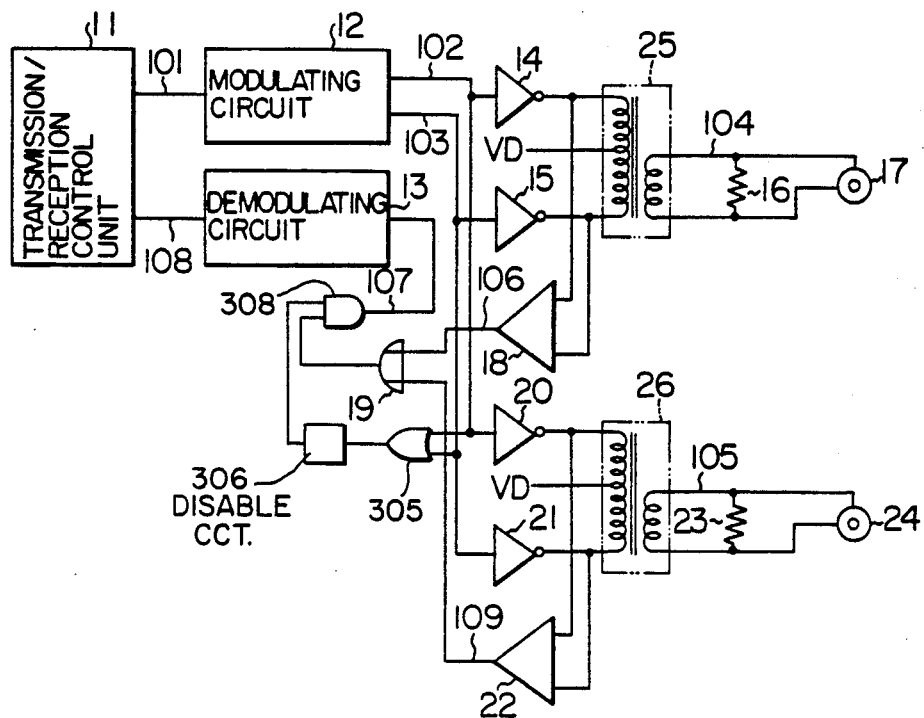
FIG. 8 is a circuit diagram showing another embodiment which is obtained by applying the present invention to a communication controller of the type shown in FIG. 1.

More particularly, as seen in FIG. 8, a transmission signal 101 delivered from a transmission/reception control unit 11 is applied to a modulating circuit 12, which in turn delivers two signals 102 and 103 to an OR gate 305, which in turn delivers a signal 413 to a disable circuit 306. The disable ciruit 306 responds by providing an output signal 415 to one input of an AND gate 308, the other input of which receives the output 107 of the OR gate 19. Thus, a signal 107 received from either of the amplifier circuits 18 or 22 via the OR gate 19 will be blocked at the AND gate 308 by the disable signal on line 415, so that no input will be applied to the demodulating ciruict 13. Thus, the occurrence of loop-back is prevented in this way.

Figure 9:
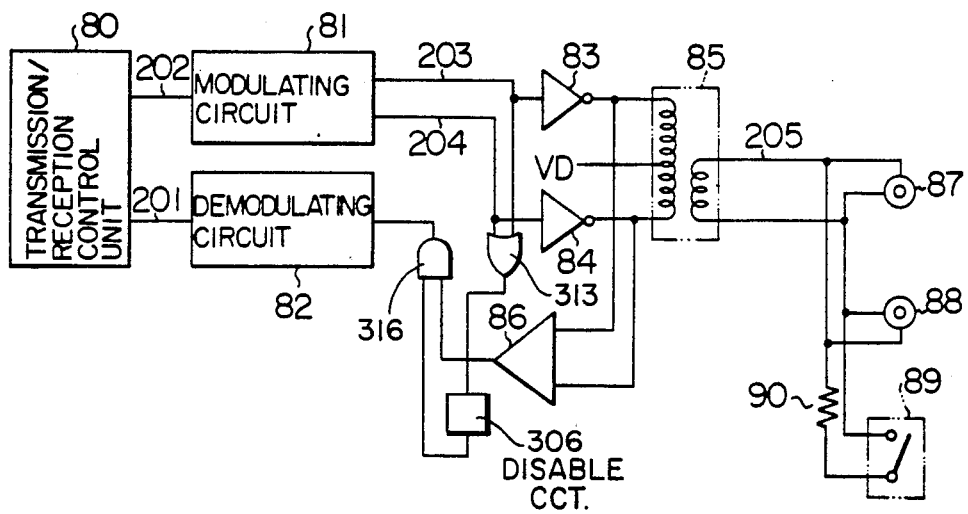
FIG. 9 is a circuit diagram showing another embodiment which is obtained by applying the present invention to a communication controller of the type shown in FIG. 2.

FIG. 9 shows another embodiment of the present invention, which differs from the embodiment of FIG. 8 only in the fact that the OR gate 19 is not provided and only one pair of driver circuits for transmission and an amplifier circuit for reception is provided. The circuit of FIG. 9 operates substantially in the same manner as that of FIG. 8 to prevent loop-back by means of the AND gate 316 responding to the disable signal 419 from the disable circuit 306.

From the foregoing description it will be seen that the present invention has the effect of preventing the occurrence of loop-back in a communication system of the half duplex bidirectional communication type. Further, the interface by coaxial signals can be changed to an interface by light signals without making any modification to the equipment. Still further, it is possible to realize optical data sets which have no limitation in terms of their installation side.

I claim:

1. A communication control apparatus for controlling communication between a signal control unit and one or more terminal units, comprising:
   modulating means for converting a logical signal generated from said signal control unit to a transmitting signal;
   at least one transmitting and receiving means for transmitting an output signal produced by said modulating means on a communication line to a terminal unit;
   demodulating means wired-OR connected between said modulating means and said transmitting and receiving means for converting a transmitted signal received from a terminal unit to a logical signal; and
   means responsive to detection of an output signal from said modulating means for preventing the output signal of said modulating means from being looped back from said wired OR connection to said signal control unit;
   wherein said modulating means comprises a modulating circuit for converting a logical signal to a bipolar transmitting signal, wherein said transmitting and receiving means includes a pulse transformer connected to said modulating circuit for converting the bipolar signal generated from said modulating circuit to an RZI bipolar signal and for delivering the same for transmission on said communication line and a circuit connecting said pulse transformer to said demodulating means and having amplifier means connected to said pulse transformer for amplifying a bipolar signal converted from an RZI bipolar signal received by said pulse transformer from said communication line, wherein said demodulating means includes a demodulating circuit connected to said connecting circuit for converting an output from said amplifier means to a logical signal, and wherein said loop-back preventing means comprises detecting means for detecting the presence of a bipolar signal from said modulating circuit and means responsive to said detecting means for disabling said connecting circuit so as to prevent said bipolar signal at the output of said modulating circuit from being looped back to said signal control unit.

2. An apparatus according to claim 1, wherein said loop-back preventing means comprises pulse generating means for generating a pulse signal having a predetermined width from the bipolar signal received from said modulating circuit, a NOR circuit for producing a logical sum of the pulse signal from said pulse generating means and said bipolar signal, and means for disabling said amplifier means in response to the output from said NOR circuit.

3. A communication control apparatus comprising:
   transmitting and receiving means for effecting transmission and reception of electric signals;
   optical transmitting means for converting an electric signal received by said transmitting and receiving means to a light signal and delivering the same;
   optical receiving means having an output terminal wired-OR connected between said transmitting and receiving means and said optical transmitting means whereby a light signal from another apparatus is received, converted to an electric signal and delivered to said transmitting and receiving means; and
   means responsive to the electric signal generated from said optical receiving means to prevent the same from being looped back to said optical transmitting means;
   wherein said transmitting and receiving means includes a pulse transformer for performing the transmission and reception of RZI bipolar signals, wherein said optical transmitting means includes an amplilfier circuit connected to said pulse transformer for amplifying a bipolar signal converted from a signal received by said pulse transformer and converting the same to a monopolar signal and an optical transmitter connected to said amplifier for converting the monopolar signal generated from said amplifier circuit to a light signal, wherein said optical receiving means includes an optical receiver for converting a received signal to an electric signal and a data separation circuit for converting the electric signal generated from said optical receiver to a bipolar signal, and wherein said loop-back preventing means comprises detecting means for detecting the presence of an electric signal at the output of said optical receiver and means responsive to said detecting means for disabling the amplifier circuit connecting said pulse transformer to said optical transmitter to prevent the bipolar signal from said data separation circuit from being looped back to said optical transmitter.

4. An apparatus according to claim 3, wherein said loop-back preventing means comprises a disable circuit for receiving the electric signal from said optical receiver to prevent the operation of said amplifier circuit.

5. An apparatus according to claim 4, wherein said disable circuit comprises a pulse generating circuit for generating a pulse signal having a predetermined width from an inverted signal of the electric signal from said optical receiver, and a NOR circuit for producing a logical sum of the output pulse signal from said pulse generating circuit and said electric signal, the output of said NOR circuit being applied to disable said amplifier circuit.

6. A communication system comprising:
   a first equipment including a transmitting and receiving circuit having a plurality of connecting means;
   at least one first communication control apparatus for transmitting and receiving electric signals from said first equipment;
   at least one second communication control apparatus for transmitting and receiving light signals from said first communication control apparatus; and
   a second equipment including another transmitting and receiving circuit for transmitting and receiving electric signals from said second communication control apparatus;
   said first communication control apparatus being connected through a coaxial cable to selected one of the connecting means of said transmitting and receiving circuit of said first equipment;
   said another transmitting and receiving circuit of said second equipment being connected to said second communication control apparatus through another coaxial cable;

said first and second communication apparatus being interconnected through two optical cables;

each of said first and second communication control apparatus comprising transmitter/receiver means for transmitting and receiving electric signals from the transmitting and receiving circuit of said first or second equipment, optical transmitting means for converting an electric signal received by said transmitter/receiver means to a light signal and transmitting the same to another communication control apparatus, optical receiving means having an output terminal wired-OR connected between said transmitter/receiver means and said optical transmitting means for converting a light signal transmitted from said another communication control apparatus to an electric signal and delivering the same to said transmitter/receiver means, and means responsive to the electric signal generated from said optical receiving means to prevent the output signal of said optical receiving means from being looped back to said optical transmitting means;

wherein said transmitter/receiver means of each of said first and second communication control apparatus includes a pulse transformer for transmitting and receiving an RZI bipolar signal, wherein each said optical transmitting means includes an amplifier circuit for amplifying a bipolar signal converted from a signal received by said pulse transformer and converting the same to a monopolar signal and an optical transmitter for converting the monopolar signal generated from said amplifier circuit to a light signal, wherein each said optical receiving means includes an optical receiver for converting a received light signal to an electrical signal and a data separation circuit for converting the electric signal generated from said optical receiver to a bipolar signal, and wherein each said loop-back preventing means comprises means for receiving the eletric signal from said optical receiver to prevent the bipolar signal from said data separation circuit from being looped back to said optical transmitter;

wherein said loop-back preventing means comprises a disable circuit for receiving the electric signal from said optical receiver to prevent the operation of said amplifier circuit, said disable circuit comprising a pulse generating circuit for generating a pulse signal having a predetermined width from an inverted signal of the electric signal generated from said optical receiver, and a NOR circuit for producing a logical sum of the output pulse signal of said pulse generating circuit and said electric signal.

* * * * *